Patented Sept. 24, 1940

2,215,876

UNITED STATES PATENT OFFICE 2,215,876

HYDROGENATION OF LIQUID OLEFIN POLYMERS

Paul Herold, Leuna, Walter Kroenig, Ludwigshafen - on - the - Rhine, Hermann Kaufmann, Leuna, and Ernst Donath, Mannheim, Germany, assignors to Standard-I. G. Company, Linden, N. J., a corporation of Delaware No Drawing. Application June 9, 1938, Serial No. 212,804. In Germany June 11, 1937

5 Claims. (Cl. 260—676)

The present invention relates to the hydrogenation of liquid olefin polymers boiling within the range of gasoline.

It has already been proposed to convert olefins into saturated hydrocarbons by treatment with hydrogen in the presence of catalysts having a hydrogenating action, and it has been proposed to carry out this process under elevated pressure.

We have now found that liquid olefin polymers boiling within the boiling range of gasolines can be converted into saturated hydrocarbons in a particularly advantageous manner by hydrogenating them in contact with catalysts which contain sulphides of molybdenum and/or tungsten (component $a$) together with sulphides of nickel and/or cobalt (component $b$). Mixtures comprising sulphides of tungsten and nickel are preferred.

The sulphides of molybdenum and/or of tungsten are employed together with those of nickel and/or of cobalt in various proportions. As a rule, between 7 and 3 molecular proportions of component $a$ are present for between 3 and 7 molecular proportions of component $b$, preferably between 3 and 1 molecular proportions of component $a$ for 1 molecular proportion of component $b$.

As a rule, in practice the catalyst consists substantially entirely of the said components. However, where desirable other catalytically active substances or promoters such as alumina, magnesia, magnesium carbonate and, in particular, other sulphides, such as zinc sulphide, vanadium sulphide or iron sulphide, or carrier substances such as diatomaceous earth, bleaching earths and the like can be added.

The components of the catalyst are preferably employed in a state of intimate mixture with one another and any suitable method for preparing the said mixed catalysts may be employed, for example, the methods for the production of mixed catalysts described in the British Patent No. 447,407 or similar methods.

The hydrogenation is, as a rule, carried out at temperatures of 150° to 350° C., in particular between 175° and 275° C., and under a pressure of more than 20 atmospheres, advantageously about 50 atmospheres, for example of about 100, 200, 250 atmospheres or more, with an excess of hydrogen. The throughput will as a rule be at least 0.4 kilogram of initial material per litre of reaction space per hour.

The process is of particular advantage for converting di-isobutene into iso-octane or mixed octenes into mixed octanes or for the conversion of tri-isobutene into the corresponding saturated hydrocarbons. If desired, together with the liquid olefines of the gasoline range to be hydrogenated, other liquid hydrocarbons may also be present. The products obtained may be employed with particular advantage as motor fuels of high octane number.

The present invention is attended by numerous advantages. In the first place the catalyst is highly resistant against poisoning so that the feed stocks and hydrogenating gases employed need not be particularly pure. The catalyst therefore retains its activity for practically unlimited periods without requiring renewal or regeneration. Moreover very high throughputs can be employed, and in particular as the process is usually carried out under rather high pressure the capacity of production of a given reaction space is very high. Furthermore substantially only saturation of the polymers occurs but no substantial cracking thereof.

The following examples will further illustrate how the invention may be carried out in practice, but it should be understood that the invention is not limited to the said examples. The percentages are by weight unless otherwise stated.

Example 1

Di-isobutene is passed together with 5 cubic metres of hydrogen per kilogram of initial material at 215° C. and under a pressure of 250 atmospheres over a catalyst consisting of 2 molecular proportions of tungsten disulphide and 1 molecular proportion of nickelous sulphide, a throughput of 1 kilogram of di-isobutene per litre of reaction space per hour being maintained. In this way, practically pure iso-octane is produced besides only 0.5 per cent of gaseous hydrocarbons. The bromine number of the product is 0.2.

If under the same conditions tungsten disulphide is employed as a catalyst, 8 per cent of gaseous hydrocarbons are produced.

Again, if a catalyst is employed consisting of a mixture of 2 molecular proportions of molybdenum disulphide and 1 molecular proportion of copper sulphide, at 215° C. and under a pressure of 250 atmospheres even with a throughput of only 0.5 kilogram of initial material per litre of reaction space per hour, a product is obtained, the bromine number of which is more than 3. If in this catalyst mixture silver sulphide is substituted for copper sulphide, similar results are obtained.

A catalyst prepared from chromium hydroxide and nickelous sulphide gives, even if the temperature is raised to 250°, under otherwise the same conditions as those last mentioned, a product which is only insufficiently hydrogenated.

*Example 2*

A crude fraction of tri-isobutene is passed with a throughput of 0.8 kilogram per litre of reaction space per hour together with 5 cubic metres of hydrogen per kilogram of initial material at 235° C. and under a pressure of 250 atmospheres over a catalyst consisting of 2 molecular proportions of tungsten disulphide and 1 molecular proportion of nickelous sulphide. A hydrogenation product is thus obtained with a bromine number of 0.4.

What we claim is:

1. A process for the saturation by hydrogenation of liquid olefin polymers boiling within the boiling range of gasoline, which comprises hydrogenating them in contact with catalysts substantially free of halides and of materials having appreciable cracking action under the conditions of treatment and which contain at least one compound selected from the group consisting of the sulfides of molybdenum and tungsten together with at least one compound selected from the group consisting of the sulfides of nickel and cobalt, whereby the said polymers are saturated with no substantial cracking thereof.

2. In the process as claimed in claim 1, working in contact with a catalyst which contains between 7 and 3 molecular proportions of said first compound and between 3 and 7 molecular proportions of said second compound.

3. In the process as claimed in claim 1, working in contact with a catalyst consisting of tungsten disulphide and nickelous sulphide.

4. In the process as claimed in claim 1, working at temperatures between 175° and 275° C.

5. In the process as claimed in claim 1, working with an excess of hydrogen under a pressure of at least 50 atmospheres.

PAUL HEROLD.
WALTER KROENIG.
HERMANN KAUFMANN.
ERNST DONATH.